Nov. 25, 1958 M. MARTIN ET AL 2,861,911

ELECTRICALLY CONDUCTIVE BODY AND METHOD OF MAKING SAME

Filed Dec. 20, 1954

INVENTORS,
MORGAN MARTIN
BY CLEMENT J. BOJANOWSKI

Oberlin & Limbach

ATTORNEYS

United States Patent Office 2,861,911
Patented Nov. 25, 1958

2,861,911

ELECTRICALLY CONDUCTIVE BODY AND METHOD OF MAKING SAME

Morgan Martin, Geneva, and Clement J. Bojanowski, Ashtabula, Ohio, assignors to Molded Fiber Glass Body Company, Ashtabula, Ohio, a corporation of Ohio Application December 20, 1954, Serial No. 476,116

7 Claims. (Cl. 154—110)

This invention relates, as indicated, to conductors of electricity and, more particularly, to conductive bodies of the type comprising a base or support of plastic material to which individual metal elements or continuous metal sheets are bonded.

It is a primary object of our invention to provide an improved method of incorporating metal in a plastic body which results in a permanent and very secure bond between the two.

Another object is to provide such a method wherein the bonding of the metal and curing of the plastic material is accomplished in one operation, thereby to simplify manufacture of articles produced in accordance therewith.

It is also an object to provide a method of forming well-defined metallic conductors in a plastic body reinforced with fibrous material, the conductors being incorporated prior to final curing of such body.

A further object of the invention is to provide an electrically conductive body of the metal-bearing plastic class characterized by superior strength and bonding of the metal.

It is an additional object to provide such a conductor in which the metal is overlain by a protective skin, which may conveniently be removed in localized areas for exposure and connection of the metal in an electric circuit.

Another object of the invention is to provide a chassis for radio receivers and the like of molded one-piece construction having firmly bonded therein metal elements which serve as wiring for the components mounted by the chassis.

Other objects and advantages will become apparent as the description of the invention proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
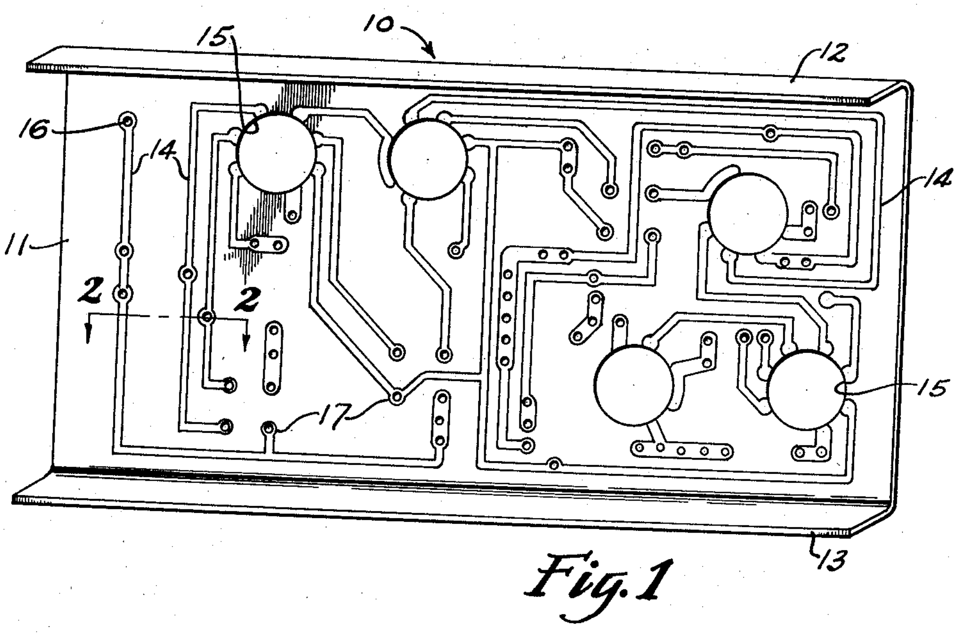
Fig. 1 is a perspective view of a chassis for a superheterodyne receiver made in accordance with the present invention.

Referring now to the drawings in detail, we have shown a radio receiver chassis, designated generally by numeral 10, as an illustrative embodiment of our improvements, this particular chassis being designed for use in a conventional A. C./D. C. super-heterodyne receiver such as published at page 267 of the RCA Receiving Tube Manual, Technical Series RC 16. The invention is concerned with the construction of the chassis and the method of manufacturing the same, without essential regard to the details of this or another circuit and, accordingly, illustration of the latter is not needed for a proper and complete understanding of the invention.

Chassis 10 is of molded one-piece construction and comprises a main body portion 11 of rectangular shape and integral flanges 12 and 13 at the longitudinal sides thereof. In order clearly to show the underside of the chassis, the structure is shown on edge in Fig. 1, and it will be understood that in normal use the body portion 11 is horizontally disposed and supported by the flanges. This is, of course, the usual arrangement of such a channel form chassis in a radio receiver.

In our structure, however, the chassis is not made of metal, as usual, but of a reinforced plastic, preferably a thermosetting plastic resin reinforced with fiber glass. Such reinforced plastic has more than adequate structural strength to support the tubes, transformers and other components of the receiver, and the one-piece channel is a complete load-bearing member in itself, as distinguished from a plastic board inserted or otherwise supported in a conventional metal chassis.

Body portion 11 has incorporated therein, adjacent its normally bottom surface, a number of conductors 14 arranged in such a pattern as to form wiring for connection of the receiver components mounted by the chassis. A series of large openings 15 is provided in the body portion for reception of the tubes employed in the receiver and a further series of small holes or perforations 16 is provided at the desired points of connection with the conductors 14. As shown most clearly in Fig. 2, holes 16 extend through portions of the conductors, and the latter are preferably enlarged to form circular terminals 17 at such points.

Connection of the circuit components to the conductors is most readily accomplished by supporting all components at the top of the chassis, passing their connecting leads or other terminals through apertures provided therefor, crimping such leads and terminals against the conductors, and then soldering all the connections by a dipping operation. It would, however, also be possible to dispose some of the components beneath the chassis, if desired, the connections in this case being secured by individual soldering rather than by a dipping operation. It will be clear that the particular pattern of the conductors 14 is designed most efficiently to accommodate placement and mounting of the circuit elements, and that the construction described eliminates the usual need for considerable external wiring.

Figure 2:
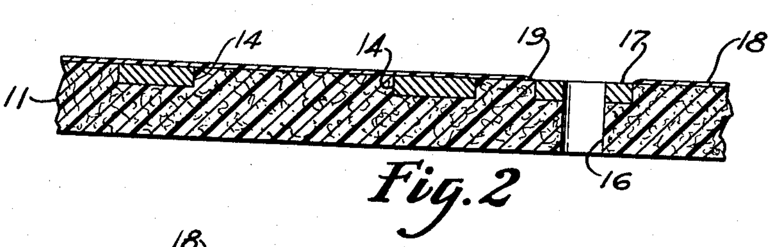
Fig. 2 is a sectional view to an enlarged scale taken on the line 2—2 in Fig. 1.

The specific character of the conductors 14 and their manner of incorporation in the chassis, as integral parts thereof, will be apparent from Fig. 2. As there shown, and as indicated earlier, the main body of the chassis is composed of fiber-reinforced plastic. Conductors 14 are formed of a suitable electrically conductive material, preferably a metal, and are deposited on a carrier sheet 18 made of a material which is compatible with the plastic employed so as to be wetted and impregnated with the latter in the manufacture, as will appear more fully below. The carrier is a thin sheet of such material and is disposed at the surface of the article, that is, the metal elements are overlain by the impregnated carrier which thereby forms a protective covering or skin. Such skin may be conveniently removed, for example, by sanding, at the local areas of the points of connection with the conductors, this being illustrated at 19 in Fig. 2.

Figure 3:
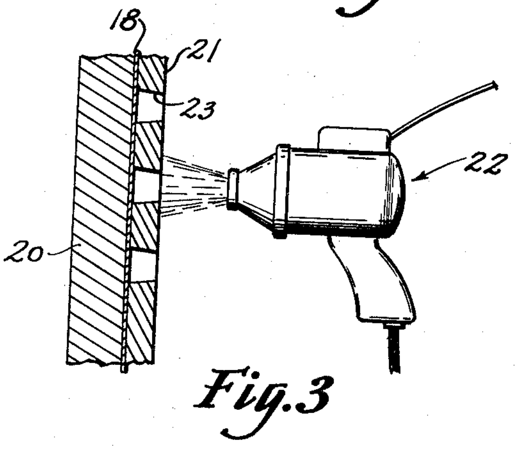
Fig. 3 is a fragmentary view illustrating a preferred step in the manufacture of our new conductive articles.

As stated previously, the whole of the article is impregnated with plastic to provide a very secure bonding of the metal elements 14. In the preferred manufacture, the metal pattern is first formed on the compatible carrier sheet in a spraying operation wherein the sheet is firmly held between a magnetic support 20 and a steel stencil 21, the metal being sprayed through the tightly held stencil by means of a suitable gun, indicated at 22. Such an assembly is shown generally in Fig. 3, and it will be clear that any commercially available metal spraying apparatus may thus be utilized. The carrier mounting may be accomplished in a magnetic chuck of suitable design, with the openings 23 of the stencil being slightly undercut to facilitate stripping thereof.

After the deposit of metal, for example, zinc or aluminum, is built up to the desired thickness on the carrier sheet, the same is arranged against a loosely constituted fibrous mat composed, preferably of fiber glass and a small amount of a plastic binder, with the metal in contact with a surface of the mat. The mat and carrier are then disposed in a molding press of a type adapted to apply both pressure and heat, and a liquid thermosetting resin is added thereto. The press is operated thoroughly and uniformly to distribute the liquid resin throughout the whole mass and to cure the same. The amount of liquid resin used is sufficient to impregnate completely the material, and it will be seen that bonding of the metal and curing of the plastic is accomplished in one operation. The result is a very secure bonding or keying-in of the metal.

The carrier is of importance, apart from its function as a protective layer for the metal in the finished article, as a means for maintaining the metal well-defined in the desired pattern during the molding operation. Where it is not essential that the metal be confined to discrete paths, for example in manufacture of a body incorporating a continuous layer of metal, the metal may be sprayed directly on the fiber mat and the body subsequently molded in the same manner. In both cases, the metal may be exposed either partially or completely by sanding of the set body.

In the manufacture of bodies, such as the chassis described, having non-planar shape, a preform approximating such shape is used in place of a generally flat mat. Such a preform is prepared by conforming chopped fiber glass to the desired shape while adding thereto a plastic emulsion as a binder and then curing the binder, the material again being rather loosely constituted. Matched metal dies provide exact shaping in the molding press, which is otherwise similarly operative.

In a specific manufacture, zinc has been deposited by spraying to a thickness of approximately .006 inch on a sheet of paper having a thickness of .003 inch and a composition of 80 percent rayon and 20 percent cellulose. This metal-bearing carrier was arranged, as described, against a plastic mat of fiber glass supplied by Owens-Corning Fiberglas Corporation and polyester resin, supplied as Bakelite BRS–193 by Bakelite Division, Union Carbide & Carbon Corporation, was added thereto. One percent of benzoyl peroxide, to act as a catalyst, and 39 percent of calcium carbonate, as a filler, were mixed with 60 percent of the indicated resin. The thickness of the article, after molding in the manner set forth, was approximately .062 inch.

It will be appreciated by those skilled in the art that other specific materials may be used within the scope of this disclosure. For example, the carrier may be made of cloth, canvas, or paper of other than the specifically identified composition, as long as it is compatible with the plastic employed for the main body of the article. Melamine, silicon resin, and epoxy resin are examples of other suitable thermosetting resins, while calcium sulphate may also be used as the filler.

It will accordingly be seen that the invention involves the bonding of metal to uncured resin, the bonding and curing being accomplished in the same operation. This is to be distinguished from bonding or securing metal, in the form of foil and the like, to a precured plastic base, as commonly practiced heretofore. Conductors made in accordance with the present disclosure can readily be soldered without danger of lifting of the metal from the plastic, due to the excellent locking-in of the metal, and there is simiarly effective resistance to peeling and damage from other causes. The fiber reinforcement of the plastic provides non-conductive bodies of superior structural strength, and the same have excellent dielectric properties.

Other modes of applying the principle of the invention may be employed, change being made as regards the details described, provided the features stated in any of the following claims, or the equivalent of such be employed.

We therefore particularly point out and distinctly claim as our invention:

1. The method of making an electrically conductive body which comprises the steps of preparing a preform of fibrous material of the approximate size and shape of the desired finished article by loosely conforming the fibers used and binding the same with a small amount of a plastic binder, spraying metal on a surface of such preform, disposing the metallized preform in a molding press, adding a predetermined amount of a liquid thermosetting resin thereto, applying pressure and heat by means of such press to distribute the resin so as to thoroughly and uniformly impregnate the preform and cure the thus distributed resin, and removing the thin plastic skin overlying the metal after setting of the article thereby to expose the metal.

2. The method of making an electrically conductive body which comprises the steps of conforming chopped glass fibers to the approximate size and shape of the desired finished article while adding thereto a small amount of a plastic binder to form a loosely constituted fibrous preform, curing the thus prepared preform, spraying metal on a surface of the preform, disposing the metallized preform in a molding press, adding liquid polyester resin to the preform in such press, applying pressure and heat by means of the press to distribute the resin throughout the preform and cure the same, and abrading the article after curing at the surface adjacent the metal bonded therein to remove the overlying skin formed in the molding operation and thereby expose the metal.

3. The method of making an electrically conductive body including a plastic base, which comprises the steps of forming discrete conductive metal elements on a carrier sheet made of a material which is compatible with the plastic of such base and electrically insulative, by spraying metal thereagainst through a stencil, applying the metal-bearing carrier sheet to a loosely bonded fibrous mass with the side of the sheet on which the metal is deposited disposed against a surface of the fibrous mass, adding liquid thermosetting resin thereto, and subjecting the material to pressure and heat such to distribute the resin throughout the mass and cure the same.

4. The method of making an electrically conductive body including a plastic base, which comprises the steps of forming discrete conductive elements of metal on a carrier sheet made of a material which is compatible with the plastic of such base and electrically insulative, by spraying metal through a stencil held against the carrier sheet, applying the metal-bearing sheet to a loosely bonded mass of fibrous material, arranging the thus associated sheet and fibrous mass in a molding press, adding thereto liquid thermosetting resin, subjecting the material to pressure and heat in such press to distribute the resin throughout the mass and cure the same, and removing the material overlying the metal in the set article to expose the same at a surface of the article.

5. The method of making an electrically conductive body including a plastic base, which comprises the steps of forming discrete conductive elements of metal on a sheet of paper compatible with the plastic of such base, by spraying metal thereagainst through a stencil, applying the metal-bearing paper sheet to a loosely constituted fibrous mat comprising glass fibers and a small amount of a plastic binder, the sheet being applied so that the metal thereon is laid against a surface of the mat, arranging the mat and the thus associated paper in a molding press, adding thereto liquid polester resin, and applying pressure and heat by means of such press to distribute the resin throughout the mass and cure the same.

6. The method of making an electrically conductive body including a plastic base, which comprises the steps of forming discrete conductive elements of metal on a sheet of paper compatible with the plastic of such base, by spraying metal thereagainst through a stencil, applying the metal-bearing paper sheet to a fiber glass mat with the metal laid against a surface of the mat, arranging the mat and thus associated paper in a molding press, adding thereto liquid polyester resin, applying pressure and heat by means of such press to distribute the resin throughout the mass and cure the same, and abrading the surface of the set article adjacent the metal elements for exposure of at least portions of the latter overlain by the molded-in paper.

7. The method of making an electrically conductive body including a plastic base, which comprises the steps of supporting a sheet of paper compatible with the plastic of such base between a magnetic element and a magnetizible stencil, spraying metal against the sheet as thus supported through the stencil to form discrete conductive metal elements on the same, arranging the sheet after deposit of such metal against a fiber glass mat with the metal in contact with the latter, disposing the mat and paper into a molding press, adding liquid polyester resin thereto, applying pressure and heat by means of such press to distribute the resin throughout the mass and cure the same, and abrading the surface of the set article adjacent the metal elements for exposure of at least portions of the latter overlain by the molded-in paper.

References Cited in the file of this patent

UNITED STATES PATENTS

| | | |
|---|---|---|
| 1,940,917 | Okazaki | Dec. 26, 1933 |
| 2,543,696 | Krueger | Feb. 27, 1951 |
| 2,613,252 | Heibel | Oct. 7, 1952 |
| 2,666,008 | Enslein et al. | Jan. 12, 1954 |
| 2,680,699 | Rubin | June 8, 1954 |
| 2,692,190 | Pritikin | Oct. 19, 1954 |
| 2,706,697 | Eisler | Apr. 19, 1955 |

FOREIGN PATENTS

| | | |
|---|---|---|
| 678,717 | Great Britain | Sept. 10, 1952 |

OTHER REFERENCES

"Printed Circuits on Foil Clad Plastics," by Robert Swiggett in "Modern Plastics," August 1951, page 100, column 1. (Copy in Div. 42.)

"New Advances in Printed Circuits," Miscellaneous Pub. 192, dtd. Nov. 22, 1948, printed by National Bureau of Standards, available from Supt. of Documents, pp. 1 and 2. (Copy available in Div. 69.)

"Printed Circuits," E. R. Gamson, Electrical World, February 1954, page 123, column 1. (Copy available in Div. 42.)

"Printed Circuit Techniques," Nat'l Bur. of Stand. Circular 468, pub. by U. S. Gov't. Prtg. Off., 1947, page 21, col. 2 and page 23, col. 1. (Copies available in Scientific Library and 41–Pr. Cir.)

Wizardry in Circuitry, reprinted from Modern Plastics, last page, April 1954, vol. 31 , No. 8. (Copies available in Scientific Library and 41–Pr. Cir.)